US006915443B2

(12) United States Patent
McBride et al.

(10) Patent No.: US 6,915,443 B2
(45) Date of Patent: Jul. 5, 2005

(54) SYSTEM AND METHOD FOR ADAPTIVELY ADJUSTING CLOCK SKEW IN A VARIABLY LOADED MEMORY BUS

(75) Inventors: Christopher D. McBride, Tomball, TX (US); Paul V. Brownell, Houston, TX (US); Timothy R. McJunkin, Idaho Falls, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 783 days.

(21) Appl. No.: 09/904,814

(22) Filed: Jul. 13, 2001

(65) Prior Publication Data

US 2003/0014681 A1 Jan. 16, 2003

(51) Int. Cl.[7] .............................. G06F 1/04; G06F 1/12; G06F 13/00; G11C 7/00
(52) U.S. Cl. ....................... 713/503; 713/400; 713/401; 713/500; 711/167; 711/170; 365/189.01; 365/194
(58) Field of Search ................................ 713/500, 503, 713/400, 401; 711/167, 170; 365/189.01, 194

(56) References Cited

U.S. PATENT DOCUMENTS 6,253,333 B1 * 6/2001 Bogumil et al. ............ 713/503
6,370,200 B1 * 4/2002 Takahashi ................... 327/237
6,496,911 B1 * 12/2002 Dixon et al. ................ 711/170
6,530,001 B1 * 3/2003 Lee ............................ 713/500
6,535,038 B2 * 3/2003 Hofstra ....................... 327/158

OTHER PUBLICATIONS

Neil H. E. Weste and Kamran Eshraghian, "Principles of CMOS VLSI Design", Addison–Wesley Publishing Company, Second Edition, pp.: 17–18.*

* cited by examiner

Primary Examiner—Lynne H. Browne
Assistant Examiner—James K. Trujillo

(57) ABSTRACT

The preferred embodiments of the present invention are directed to the selective phase lag and time delay of clock signals within a computer system to compensate for additional parasitic capacitance that may be added to that system because of its open architecture. More particularly, the preferred embodiments are directed to clock signal path circuits where each circuit has multiple signal paths of varying lengths. By allowing the clock signals to propagate along a particular path, phase lag or time delay is added to those clock signals. Selection of a particular path for the clock signal is made by activating electrically controlled switches which themselves are activated or deactivated by software programs that run during power-up of the computer system that determine required phase lag or time delay of those clock signals as a function of parasitic capacitance in the computer system.

29 Claims, 4 Drawing Sheets

SYSTEM AND METHOD FOR ADAPTIVELY ADJUSTING CLOCK SKEW IN A VARIABLY LOADED MEMORY BUS

CROSS-REFERENCE TO RELATED APPLICATIONS

None.

STATEMENT REGARDING FEDERALLY SPONSORED RESEARCH OR DEVELOPMENT

Not applicable.

BACKGROUND OF THE INVENTION

1. Field of the Invention

The present invention relates generally to computer systems having open architecture buses. More particularly, the present invention relates to compensating for the insertion or removal of additional random access memory devices in a computer system. More particularly still, the invention relates to adjusting clock skew to compensate for the electrical characteristic changes associated with the insertion or removal of random access memory devices.

2. Background of the Invention

Computers represent information in a binary format. That is, computers represent information in variables that have only two states, otherwise known as digital variables. In the electrical context, the two states of information are generally represented by two voltages—a low voltage (or no voltage) representing a first state and a high voltage representing a second state. In some systems, a low or zero voltage state represents a logic zero, and a 3.3 volt state represents a logic one. Computers perform their amazing tasks and talents by operating on and manipulating strings of information represented by these zeros and ones.

Each portion of a computer system is designed to perform a particular task. To complete the operations required for the overall execution of a program, for example, information must be transferred between various portions of the computer system. The microprocessor of the computer system is the device charged with performing most operations on data within the system to perform tasks. However, a microprocessor is limited in its data storage capacity, and thus computer systems also have memory devices that store information for the microprocessor and other computer system components. At various times in the operation of the computer, the microprocessor requests copies of information stored in the main memory, and likewise requests the placement of information back into that main memory for semi-long-term storage. As computer microprocessor speeds increase, the transfer of information between the various components of the computer system becomes more complicated. One of the complicating factors in this exchange of information is how fast the voltages representing the logic states zero and one can be forced upon or driven to buses within the system.

Consider, for example, two generic devices within a computer system coupled by a bus system consisting of a plurality of wires or traces on a printed circuit board 64 bits wide. Considering only the data lines, and not the address or error correction lines, there would be 64 wires or traces on the printed circuit board coupling the first generic device, from which information is transferred, to the second generic device, to which the information is transferred. At particular pre-defined times based on a host clock signal, the voltage on each trace of the bus connection represents a logic zero or a logic one as described above. The sending device drives those voltages, and the receiving device senses those voltages, hence an exchange of data. If more than 64 bits of information need to be transferred, then the data bus operates multiple times, adjusting the voltages on each trace to represent the corresponding logic value for that particular portion of the data transfer.

FIG. 1 shows an idealized exemplary voltage on one of those data bus traces as a function of time. In particular, FIG. 1 shows that initially the voltage on that trace line to be low or zero, which could represent a point in time where no information exists or is being driven. Instantaneously, the voltage rises to a higher voltage level, representing a first logic state. As time passes, the high voltage again instantaneously changes to a lower voltage, representing the second logic state. The drawing of FIG. 1 is said to be idealized because no actual electrical system is capable of generating a waveform having the instantaneous changes in voltage shown. Stated another way, no physical system is capable of producing a waveform with such sharp transitions in voltage.

FIG. 2, by contrast, shows a more realistic transition in logic states between a low voltage and a high voltage of the exemplary trace of the data bus under consideration. FIG. 2 shows that rather than an instantaneous change in voltage, the voltage slowly, and to a great extent exponentially, rises until at some point it reaches the higher voltage state. Likewise, FIG. 2 shows that the transition from a high voltage to a low voltage is not instantaneous in actual physical systems, but instead decays exponentially toward the lower voltage point.

These deviations in waveforms between FIG. 1, in the idealized case, and FIG. 2 are attributable to parasitic capacitances inherent in any electrical system. How fast, or how slow, a change of state may occur is proportional to the parasitic, or designed, capacitance attached to the bus system. Whether or not the slow rise and fall times for a particular waveform are a problem depends on the speed at which information is exchanged.

Early computer systems had microprocessors that operated in the low tens of megahertz (MHz) range. In the late 1980s, for example, a computer system with a microprocessor operating at 12 MHz was considered extremely fast. By contrast, within the last few months of the filing date of this patent, some computer manufacturers have offered computer systems with microprocessors that operate at 1 GHz (1,000 MHz) or more. FIG. 3 shows an exemplary plot as a function of time of the voltage of a clock signal operating at 12 MHz. More specifically, FIG. 3 shows one complete cycle of a 12 MHz clock signal that begins at point A and ends at point B. The period of a 12 MHz clock, that is the amount of time to complete one cycle, is about 83 nano-seconds (ns). Thus, the time represented on the horizontal axis of the plot between point A and point B likewise represents 83 ns. Comparing FIG. 2 plotted directly above FIG. 3, it is seen that although there is a certain amount of time required for the signal represented in FIG. 2 to hit its maximum voltage, this time is well within the first half clock period of the 12 MHz clock.

By contrast, FIG. 4 shows the plot of one complete cycle of a 133 MHz clock, which speed is the standard operational speed of data transfer across buses using current technology. The time axis of FIG. 4 is the same as that of FIG. 3. The period of the waveform of a 133 MHz clock is about 7.5 ns, which, by referring to FIG. 3, is significantly shorter than the period of a 12 MHz clock. In a system having a bus transfer scheme operating at 133 MHz, a rise time as slow as that indicated in FIG. 2 causes significant problems in the transfer of information. Indeed, the waveform plotted at FIG. 2 would not even reach its maximum value before the completion of a complete waveform of the 133 MHz clock. Given that most exchanges of information happen on a rising or a falling edge of the clock signal, it is apparent that a computer system having a parasitic capacitance resulting in a waveform of that of FIG. 2 would not be capable of transferring information even on the rising edges only of a 133 MHz clock, as it would take more than one complete period for the voltage to develop on the trace of the data bus.

Computer manufacturers have been somewhat successful in managing this parasitic capacitance to keep it at a level below which causes problems as the speed of data transfers have increased. However, open architecture systems give the end user the capability of modifying the components of their systems. Each time the end user adds a component to the system, that user also adds parasitic capacitance, which affects the data transfer capability in the system.

Thus, what is needed is a way to adaptively compensate for the parasitic capacitance of a computer system.

BRIEF SUMMARY OF THE INVENTION

The problems noted above are solved in large part by a computer system that adaptively compensates for parasitic capacitance on a bus by adjusting the phase lag of clock signals associated with reads and writes to that bus. Stated another way, an embodiment of the present invention implements time delay into the read and write clocks for data transfers to compensate for the rise and fall time changes associated with the addition of parasitic capacitance to a computer system.

In one embodiment, the selective phase lag (or time delay) is accomplished by implementing a plurality of clock signal paths, with each path having a different length. A clock signal that propagates a shorter path will have less time delay (and thus less phase lag) than a clock signal that propagates a long clock signal path. Thus, in an embodiment, one of multiple clock signal paths may be chosen.

The multiple clock paths having varying lengths are preferably implemented using field effect transistors (FETs) on both the entry and exit side of each signal path. To select a particular signal path, the FETs for that signal path are activated and thus the clock signal is allowed to propagate along that path. Activation of the FETs is preferably accomplished by assertion of control signals originating from somewhere within the computer system. In one embodiment, these control signals originate at the South bridge device. In another embodiment, these control signals may originate from the Super I/O controller.

An embodiment also comprises a read only memory (ROM) within the computer system. The ROM stores a software program, executable by the microprocessor, which determines the particular signal path needed. This determination, in one embodiment, is made by determining the number of dual inline memory modules (DIMMs) present in the main memory array of the computer system, and then referring to a predetermined look-up table which indicates the clock delay needed based on the number of DIMMs. In a second embodiment, the software stored on the ROM, and executed by the microprocessor, tests each possible signal or clock path to determine the shortest path (the least amount of phase lag or time delay) that can be used in the computer system without invoking bit errors in the data transfer. Once the particular signal path is determined, the software program preferably selects that signal path as the standard operating path.

The selective phase lag of clock signals within a computer system may be implemented in multiple locations. In one embodiment, a phase lag circuit is disposed between the source of a clock signal and the device which uses that clock signal to read or write information onto the data bus. Disposing the clock delay circuit in this location gives this embodiment the ability to adjust the phase lag (or time delay) of only a single clock signal. A second embodiment is a computer system that has a variable path length circuit within the feedback loop of a phased locked loop (PLL) device. By selectively adjusting the length of the feedback path of the PLL, this embodiment adjusts the phase relationship of all the PLL output signals with respect to the PLL input signal. In this way, multiple clock signals can be adjusted by varying the length of the feedback path of the PLL.

Another embodiment is a computer system having both the variable length feedback path circuit in the feedback of the PLL and one or more clock delay circuits coupled to the various clocks of the system. In this way, each of the paths (the PLL feedback path and the clock circuit path) may be adjusted to provide an even more adaptive mechanism for adjusting phase lag and time delay of clock signals based on the amount of parasitic capacitance present in the system.

BRIEF DESCRIPTION OF THE DRAWINGS

For a detailed description of the preferred embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to. . .". Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION OF THE PREFERRED EMBODIMENTS

Figure 1:
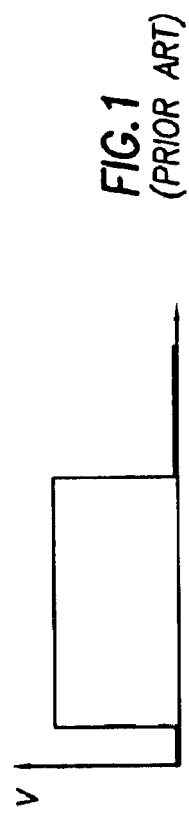
FIG. 1 shows an idealized voltage transition on a trace of a printed circuit board.
Figure 2:
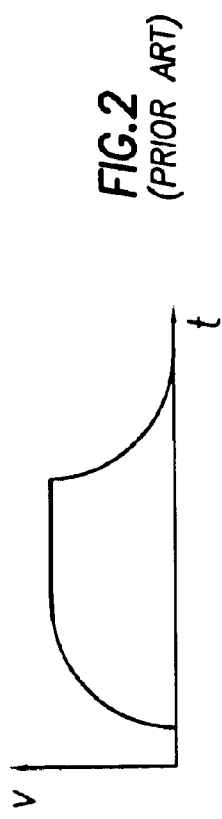
FIG. 2 shows a more realistic voltage transition on a trace of a printed circuit board.
Figure 3:
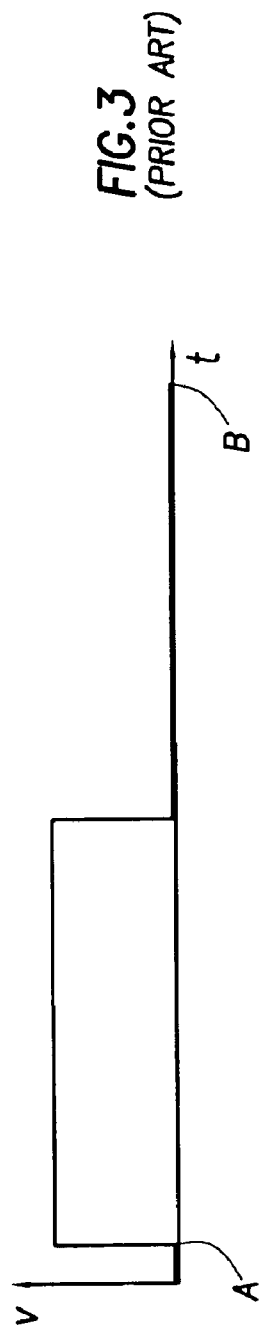
FIG. 3 shows one complete waveform of a 12 Mhz clock.
Figure 4:
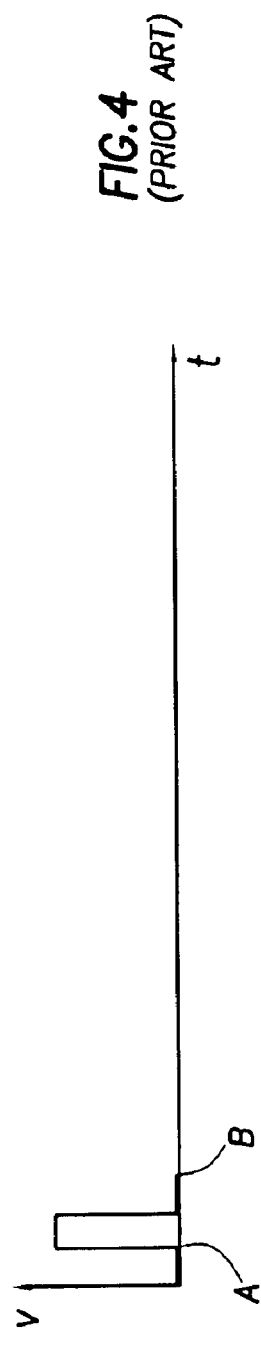
FIG. 4 shows one complete waveform of a 133 Mhz clock.
Figure 5:
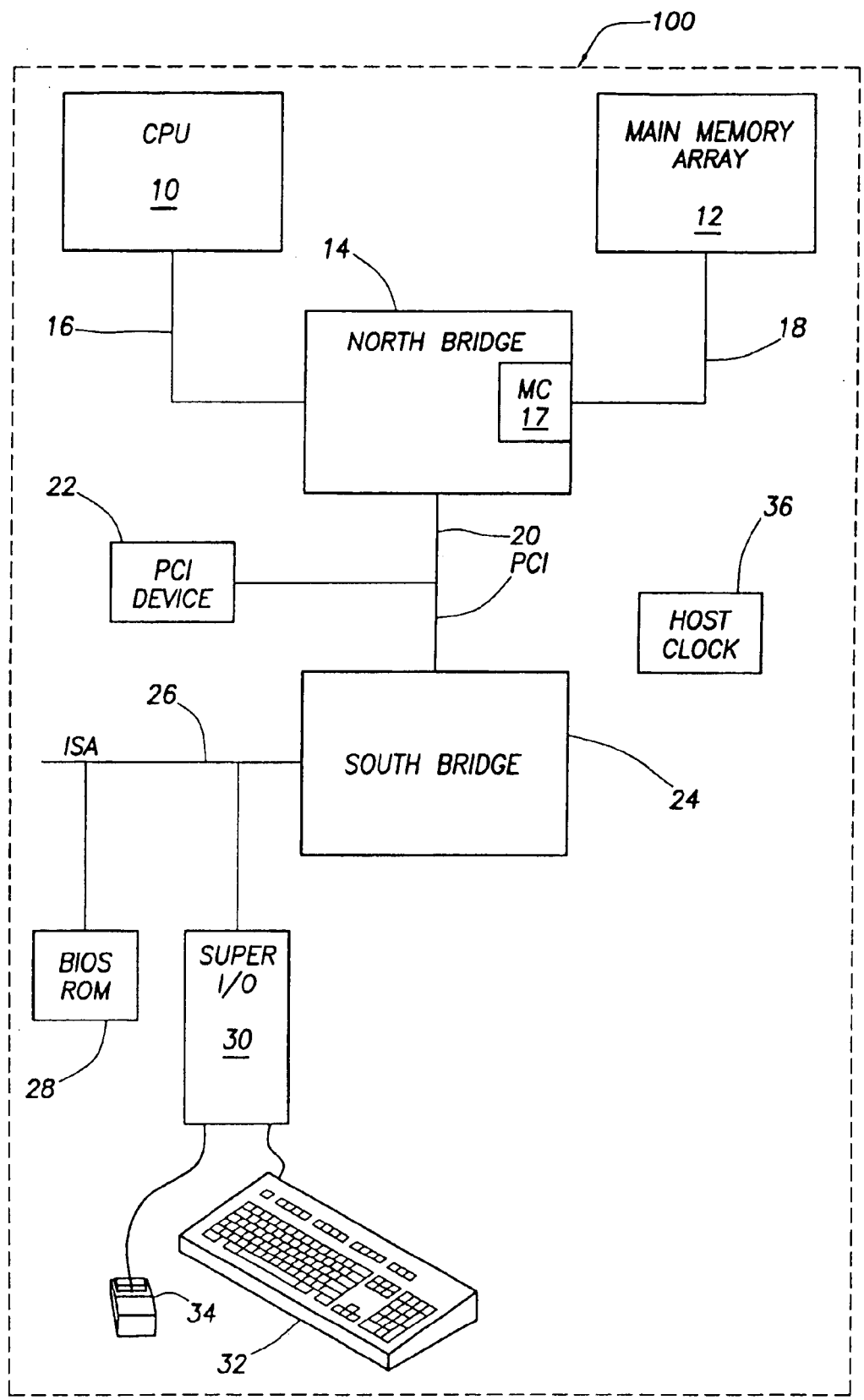
FIG. 5 shows a computer system of a preferred embodiment.

Referring now to FIG. 5, computer system 100, in accordance with the preferred embodiment, preferably comprises a processor or CPU 10 coupled to a main memory array 12 through an integrated bridge logic device 14. As depicted in FIG. 2, the bridge logic device 14 is sometimes referred to as a "North bridge," based generally upon its location within a computer system drawing. The CPU 10 preferably couples to the bridge logic 14 via a CPU bus 16, or the bridge logic 14 may be integrated into the CPU 10. The CPU 10 preferably comprises a Pentium Pentium III® microprocessor manufactured by Intel®. It should be understood, however, that other alternative types and brands of microprocessors could be employed. Further, an embodiment of computer system 100 may include multiple processors, with each processor coupled through the CPU bus 16 to the bridge logic unit 14. To increase memory capability, and memory bus bandwidth, multiple bridge logic units 14 may be used, each coupled to its own main memory array 12.

The main memory array 12 preferably couples to the bridge logic unit 14 through a memory bus 18, and the bridge logic 14 preferably includes a memory control unit 17 that controls transactions to the main memory by asserting the necessary control signals during memory accesses. The main memory array may comprise any suitable type of memory such as dynamic random access memory (DRAM), or any of the various types of DRAM devices.

The North bridge 14 bridges various buses so that data may flow from bus to bus even though these buses may have varying protocols. In the computer system of FIG. 5, the North bridge 14 couples to a primary expansion bus 20, which in the preferred embodiment is a peripheral component interconnect (PCI) bus. FIG. 5 also shows a PCI device 22 coupled to the primary expansion bus 20. PCI device 22 may be any suitable device such as a modem card or a network interface card (NIC). One skilled in the art will realize that multiple PCI devices may be attached to PCI bus 20, yet for clarity of the figure, only one is shown.

The preferred embodiment further includes a second bridge logic device, a South bridge 24, coupled to the primary expansion bus 20. This South bridge 24 couples, or bridges, the primary expansion bus 20 to other secondary expansion buses. These other secondary expansion buses may include an industry standard architecture (ISA) bus 26, a sub-ISA, a universal serial bus (USB), and/or any of a variety of other buses that are available or may become available in the future. In the embodiment shown in FIG. 5, the South bridge 24 bridges Basic Input Output System (BIOS) Read Only Memory (ROM) 28 to the primary expansion bus 20, therefore, programs contained in the BIOS ROM 25 are accessible by the CPU 10. Also attached to the ISA bus 26 is Super Input/Output (Super I/O) controller 30, which controls many system functions, including interfacing with various input and output devices, such as keyboard 32. The Super I/O controller 28 may further interface, for example, with a system pointing device such as a mouse 34, various serial ports (not shown) and floppy drives (not shown). The Super I/O controller is often referred to as "super" because of the many I/O functions it may perform.

The BIOS ROM 28 contains firmware embedded on a ROM memory chip and performs a number of low-level functions. For example, the BIOS executes the power on self test (POST) during system initialization ("boot-up"). The POST routines test various subsystems in the computer system, isolate faults and report problems to the user. The BIOS also is responsible for loading the operating system into the computer's main system memory. Further, the BIOS handles the low-level input/output transactions to the various peripheral devices such as the hard disk drive and floppy disk drives.

Also shown in FIG. 5 is a host clock 36. The host clock 36 output signal couples to many of the computer system 100 components, including the CPU 10, North bridge 14, main memory array 12, and South bridge 24. Although the host clock 36 couples to many of the devices in the computer system 100, those connections are not shown in FIG. 5 for simplicity of the drawing.

Figure 6:
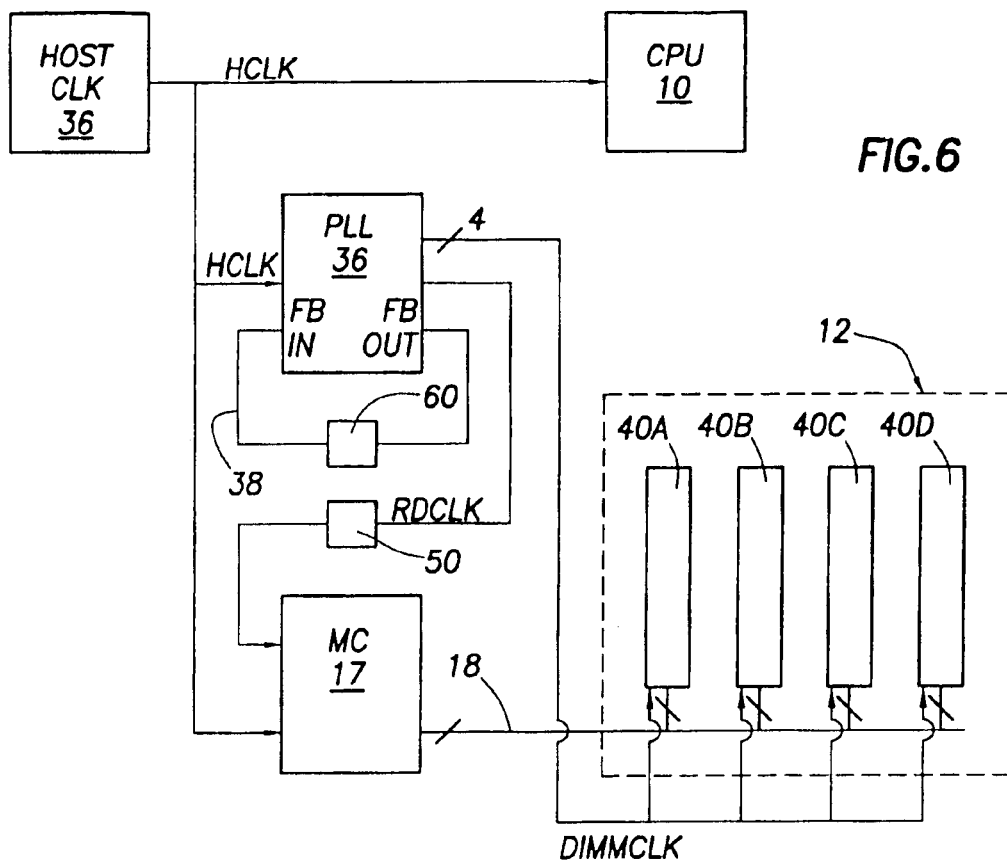
FIG. 6 shows the coupling of various clock signals within the computer system as it relates to an embodiment of the present invention.

FIG. 6 shows a more detailed description of an embodiment of the present invention. In particular, FIG. 6 shows that the host clock 36 signal (HCLK) couples to many system components including the CPU 10, the memory controller 17 of the North bridge logic 14, and a phase locked loop (PLL) 36. The phase locked loop 36 is a device which takes an input signal of a particular frequency and produces a plurality of output signals. Each of the output signals of the PLL 36 have the same frequency as the input, in this case the HCLK, but are preferably shifted in phase relationship to the HCLK signal. In particular, the phase relationships between the PLL 36 output and its input (HCLK) is a function of the length of the feed-back path 38 between the FB Out pin and the FB In pin. An example of a phase lock loop having these characteristics is a device made by Cypress Semiconductor Corporation, part number CY 2510. Thus, the outputs of the PLL 36 couple to various devices in the computer system as necessary. In an embodiment, outputs of the PLL 36 couple to the main memory array 12 and the memory controller 17 of the North bridge logic 14.

Referring still to FIG. 6, memory array 12 preferably comprises a series of modules 40A–40D. Each of the modules 40A–40D are preferably DRAM memory arrays in packages known as Dual Inline Memory Modules (DIMMs). Although four such modules are shown in FIG. 6, it must be understood that for the computer system 100, any number of DIMM modules 40A–D could be used. For example, if the computer system 100 has only a single North bridge 14 device, the computer could operate with as few as one or as many as four of the DIMM 40A–40D devices. Likewise, if computer system 100 comprised dual North bridge devices 14, each coupled to its own memory array 12, then as many as eight of these DIMMs could exist within the system. End users of computer systems have the capability to add and remove these DIMMs to adjust the amount of main memory present in their systems. With the addition of each DIMM, however, additional parasitic capacitances couples to the memory bus 18. In particular, each DIMM module adds a specific amount of parasitic capacitance which, as discussed above, affects the amount of time it takes to drive or drain a logic state onto each trace of the data bus.

Figure 7:
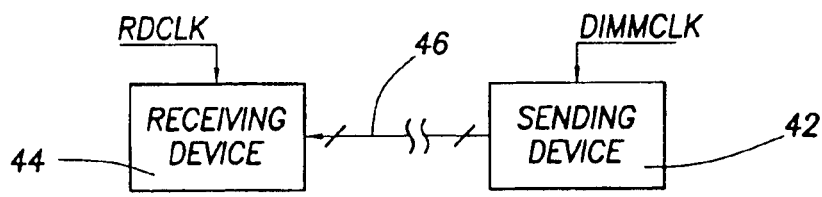
FIG. 7 shows hardware associated with a generic transfer of information from a sending device to a receiving device.

Consider the generic system depicted in FIG. 7. In particular, consider the generic transfer of information from a generic sending device 42 to a generic receiving device 44 across an arbitrary bus 46. Although the propagation of electrical signals along wires and traces of printed circuit boards is extremely fast, on the order of 1 inch in every $200 \times 10^{-12}$ seconds (200 pico-seconds (ps)), the speed is finite. Thus, in the generic system of FIG. 7, the information driven to the bus 46 is not instantaneously available at the receiving device 44; rather, the availability of the data driven by the sending device 42 at the receiving device 44 is, in part, a function of the distance between the two devices. Although this problem is presented with respect to the generic system of FIG. 7, this problem exists for every transfer of information within a computer system, be it between the CPU 10 and the main memory array 12 or the data generated by the pointing device 34 and the Super I/O 30. Thus, if the sending device clock and the receiving device clock, in FIG. 7 DIMMCLK and RDCLK, are exactly in phase (rise and fall at exactly the same time), then the exchange of information will not occur if the sending device drives on the leading edge of the clock and the receiving device is simultaneously trying to read that information on the rising edge of that same clock. To compensate for such a situation, and referring to FIG. 8, the preferred embodiment shifts or skews the clocks between the sending and receiving devices. With regard to the generic transfer of information between the sending device 42 and the receiving device 44, the sending device clock preferably leads the receiving device clock in time by at least an amount to allow the propagation of the signals driven on to the generic bus 46 between the two devices.

Figure 8:
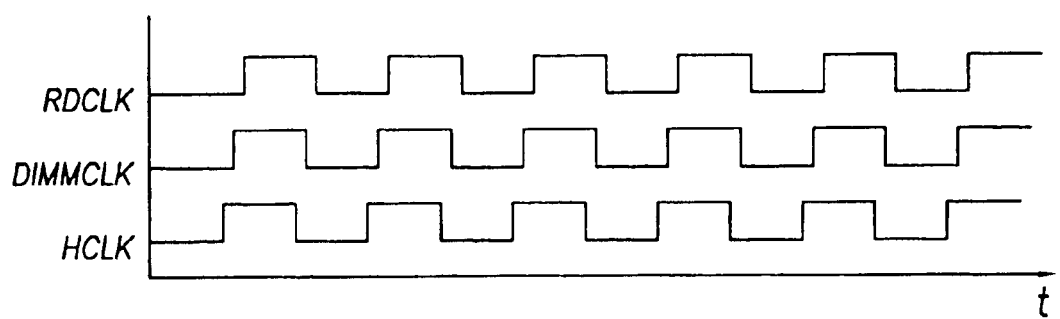
FIG. 8 shows an exemplary timing diagram of clock signals in an exchange of information on a data bus.

FIG. 8 shows a timing diagram which satisfies the propagation time constraints of the generic data transfer of FIG. 7. In particular, FIG. 8 shows a host clock (HCLK) from which each of the clocks discussed are derived (hardware to perform this task not shown in FIG. 7). The DIMMCLK is plotted above the host clock, and the DIMMCLK has the same frequency as the HCLK, but is shifted in phase (has a phase lag) such that there is a finite amount of time between the rising edge of the HCLK and the corresponding rising edge of the DIMMCLK. Likewise, FIG. 8 shows there is a time delay between the corresponding rising edge of the read clock (RDCLK) and each of the DIMMCLK and HCLK signals. Thus, in the generic transfer of information in the system of FIG. 7, the sending device 42 preferably drives the data onto the generic bus 46 with the rising edge of the DIMMCLK signal. At some finite time afterwards, the RDCLK signal preferably transitions to an asserted state informing the receiving device 44 to read the information on the generic bus 46. Again, the delay between the rising edges of the DIMMCLK and the RDCLK is sufficient to allow the data signals driven to the generic bus 46 to propagate the distance between the sending device 42 and the receiving device 44. It must be understood that the terms "phase lag" and "time delay" may be used somewhat interchangeably. Phase lag (or phase lead for that matter) means that when one is comparing two or more signals having the same frequency and the same shape, there is some difference in times when the signals make transitions. In this case, the two signals are said to have the same frequency, but differ in phase. This, however, is equivalent to saying that the signal with the phase lag is somewhat time delayed as compared to the signal that has no phase lag whatsoever. Thus, the term "phase lag" may be generally used when discussing the difference between two signals having the same frequency, and the term "time delay" may be used when discussing a single signal, it is clear that the definition of each of these is significantly intertwined.

Now understanding the characteristics the propagation delay of signals in wires and on the traces of printed circuit boards, an exemplary exchange of information with regard to FIG. 6 is discussed. In particular, the concern is the exchange of information between any one of the DIMMs 40A–40D and the memory controller 17. This transfer of information could be the result of a request from the CPU 10 for a block of data. Likewise, the PCI device 22 could initiate such a transfer of information. One of ordinary skill in the art knows of many instances in a computer system where such an exchange of information between the main memory array 12 and the memory controller 17 is required. Similar to the case described with respect to FIG. 7, in the exchange of information, the main memory array 12, in particular one of the DIMMs 40A–40D, is the sending device and the memory controller 17 is the receiving device. There is a finite distance the signals must travel along the memory bus 18 to reach the memory controller and thus the timing of the write and read clocks between the DIMM modules 40A–40D and the memory controller 17 must be adjusted. The exemplary timing diagram of FIG. 8 is equally applicable to the exchange of information in this case. In particular, one of the DIMMs 40A–40D drives the requested data to the memory bus 18 on the rising edge of the DIMMCLK signal. The memory controller reads information off the memory bus 18 on the rising edge of the RDCLK signal. Thus, the difference in phase, or time delay, between the DIMMCLK and the RDCLK must be great enough to allow the signals on the memory bus 18 to propagate before the memory controller 17 attempts to read those signals.

The same timing problems exist regarding the propagation delay of the signals in the transfer of information between the memory controller 17 and any one of the DIMMs 40A–40D. In the case of data writes in this direction, the memory controller 17 writes the data on the rising edge of the HCLK and the DIMMs 40A–40D read the information on the rising edge of their DIMMCLK (FIG. 8). Here again, the phase delay between the HCLK and the DIMMCLK must be sufficient to allow the propagation of the data across the printed circuit board traces.

As mentioned above, adding DIMMs to the main memory array 12 adds parasitic capacitance to the memory bus 18 trace lines. Thus, if a designer precisely compensates for the amount of parasitic capacitance and propagation delay for a particular system, the addition of a DIMM, e.g., DIMM 40B, may hamper the exchange of information because the additional capacitance on the memory bus 18 would thus require a longer rise time for the driving of valid data. In order to address such a problem, an embodiment of the present invention compensates for the addition of parasitic capacitance by adaptively adjusting the time delay (or phase lag) between the DIMMCLK and RDCLK. This adjustment is preferably in addition to any clock delay required to compensate for propagation times described above.

Figure 9:
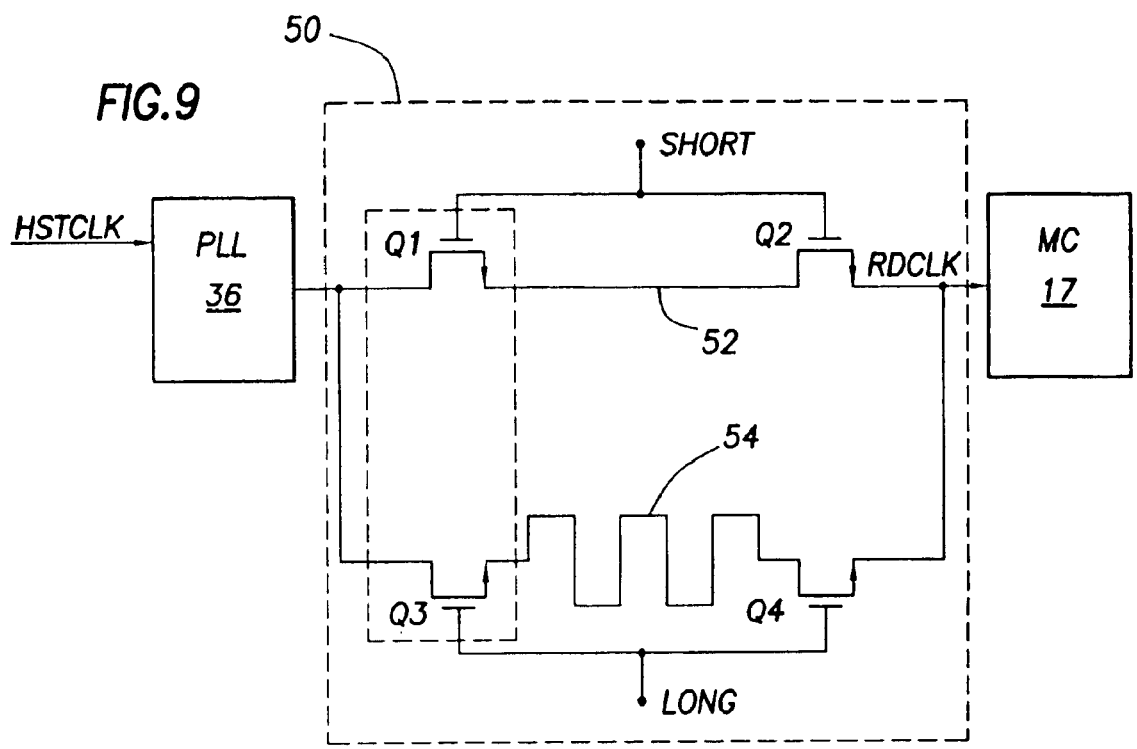
FIG. 9 shows an embodiment of a time delay circuit disposed between a clock source and destination.

FIG. 9 shows an embodiment of a structure where the length of a trace on a printed circuit board is adjusted, a clock or phase delay circuit 50. In this embodiment, the RDCLK from the PLL 36 to the memory controller 17 has two possible paths. The short path 52 is significantly shorter than the long path 54, and the path used preferably depends upon the delay needed in the RDCLK. Thus, the same characteristic of signal propagation that necessitates adjusting the phase lag (or time delay) of the clock signals is preferably used to compensate those clocks for the presence of parasitic capacitance. That is, as parasitic capacitance is added to the system, additional clock delay is required to allow longer logic setup times. The computer system 100 of the preferred embodiment could have anywhere between one and four DIMMs 40A–40D. If it is assumed for a moment that the computer system 100 has only one DIMM, e.g. 40A, then the parasitic capacitance associated with that single DIMM module will be low. In such a situation, the rise time for driving data onto the memory bus 18 may not be significantly affected by the presence of the parasitic capacitance of that single DIMM. In a write of information from the main memory array 12 to the memory controller 17, the RDCLK for the memory controller 17 need not lag the DIMMCLK by much (to compensate for the parasitic capacitance, but there may be lag present to compensate for propagation times), and in that case, the RDCLK could take the shorter path 52 exemplified in FIG. 9. If, however, the computer system user installs additional DIMMs, e.g., 40B–40D, then there may be four times the parasitic capacitance present on the memory bus 18. In such a situation, the rise time for driving data onto that bus is altered from the case of only a single DIMM 40A. In this situation, it may be necessary to delay or phase lag the RDCLK more than the delay or phase lag required for the single DIMM module. In this instance, the computer system 100 preferably sends the RDCLK signal between the PLL 36 and the memory controller 17 along the longer path 54, thus shifting in phase the RDCLK from the DIMMCLK to allow more set-up time for the data driven to the memory bus 18.

More particularly, and still referring to FIG. 9, the path that the RDCLK signal takes is controlled by selectively turning on and off the Field Effect Transistors (FETs) Q1–Q4, which act as electrically controlled switches. Field Effect Transistors have the inherent characteristic that the impedance presented in the conductive mode, between their source and drain, is very low, and conversely act as an open circuit when they are not conducting. Thus, in the structure depicted in FIG. 9, the FETs Q1–Q4 preferably act as voltage or electrically controlled switches selectively allowing signals to pass, based on their gate voltage. When implementing the relatively short phase delay of the RDCLK, the short signal path 52 is preferably selected by forcing FETs Q1 and Q2 into their conductive mode, and forcing FETs Q3 and Q4 into their open circuit mode. Allowing FETs Q1 and Q2 to conduct allows the signal between the PLL 36 and the memory controller 17 to take a the shorter path. Conversely, forcing the RDCLK to take the longer path 54 (as would be required if additional parasitic capacitance is present) is preferably accomplished by allowing FETs Q3 and Q4 to conduct and forcing FETS Q1 and Q2 into their open circuit mode. In such a circumstance, the RDCLK travels the longer path as indicated. An example of FETs capable of performing this quick switch service is a device manufactured by Texas Instruments, Inc., device number TISN74CBT53306. This TI device houses two such FET quick switches, and one such overall device could be used for Q1 and Q3 as indicated by the dashed line around Q1 and Q3 in FIG. 9.

Although in one embodiment it is possible to hard-wire the FETs into their conductive or non-conductive state based on the number of DIMMs in a computer system, another embodiment dynamically adjusts the clock trace length for a particular system based on the number of DIMMs present. This embodiment preferably implements software instructions or computer code in the BIOS ROM 28 which is preferably executed by the microprocessor at system startup. A first implementation of the computer code in the BIOS ROM 28 includes a look-up table. An exemplary look-up table is given below as Table 1.

TABLE 1

| DIMMs | 1 | 2 | 3 | 4 |
|---|---|---|---|---|
| CLKPATH | S | S | L | L |

This exemplary table shows that for one or two DIMMs in the computer system, the short path (S) length is selected by the code stored in the BIOS ROM and executed by the microprocessor. Likewise, Table 1 shows that when there are three or four DIMMs in the computer system, the BIOS ROM code selects the path length for the RDCLK to the long path (L). It must be understood that the look-up table of Table 1 is exemplary only. The break-over point between using the short path length and the long path length could occur anywhere in the table, e.g., between one DIMM and two DIMMs or between three DIMMs and four DIMMs. Likewise, there may be more than two path lengths, and in this case the addition of each DIMM could precipitate a change in path length. Preferably during the normal power on self-test procedures, the code stored on the BIOS ROM determines the number of DIMMs 40A–40D present in the system and adjusts the trace lengths according to the table.

Figure 10:
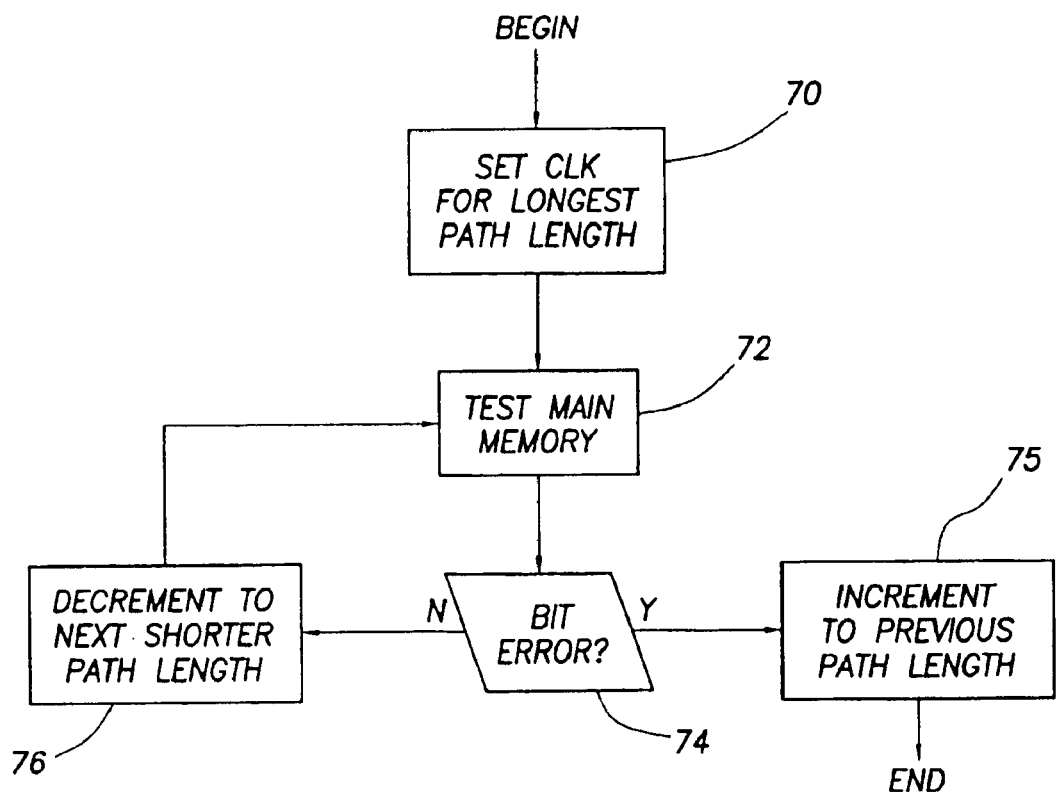
FIG. 10 shows an exemplary flow diagram for software instructions to implement one embodiment of the present invention.

A second embodiment of the BIOS ROM 28 software implementation is shown in FIG. 10. In particular, FIG. 10 shows a flow diagram for adaptively determining the clock delay required in the computer system 100. In particular, the BIOS ROM computer code, executed by the CPU 10 at system start-up, sets the clock delay for the longest path length at block 70. Thereafter, the main memory array 12 is tested as indicated at block 72. This test could be as simple as the transfer in either direction of data involving the main memory array 12 and the memory controller 17. This test preferably looks for bit errors, that is, where a bit driven to the bus is different than the bit sensed, as indicated by a failure of parity or other error correction scheme. If no bit error is detected as indicated in block 74, the BIOS ROM code preferably decrements the clock to travel the next shorter path length, as indicated at block 76. Thereafter, the main memory is again tested as indicated at block 72, and again a determination is made whether any bit errors exist. The sequence of decrementing to the next shortest path length, testing the memory, and looking for bit errors continues until the path length for the clock at issue becomes so short that bit errors begin to occur. That is, as the path length becomes shorter, the phase lag between sending and receiving clock become so short as to invoke errors because the parasitic capacitance on the data transfer bus has so lengthened the rise and fall times that the receiving device attempts to read the information before the sending device has had the opportunity to completely develop the voltages on the bus. At the first indication of a bit error in the transfer, the BIOS ROM code sets the path length to the last path length where no errors were detected, as indicated at block 75.

Thus, rather than have a look-up table as indicated above, the BIOS ROM code in this embodiment adaptively determines the optimum clock phase delay and selects that path as the normal operating path as described above. Such an embodiment would allow each particular computer system to adjust its read clock delay to compensate for other irregularities that exist between otherwise identical computer system boards.

Thus, if a computer system user powers the system down and adds or removes one or more DIMMs 40A–40D, preferably on the next power up the computer system determines the number of DIMM modules and adjusts appropriate trace lengths (either by the look-up table embodiment or the bit error embodiment) to compensate for the parasitic capacitance added or lost by the user's actions.

The gates of the quick switch FETs Q1–Q4 are preferably coupled to control signals which are preferably coupled to a set of general purpose digital outputs available on a control device in the system. The South bridge 24 is one such control device in a computer system that typically has such general purpose digital outputs available. Thus, the gates of the quick switch FETs preferably couple to the general purpose outputs of the South bridge 24, and these general purpose outputs are preferably asserted or deasserted by the software stored in the BIOS ROM 28 and executed during system startup. Using general purpose digital outputs of the South bridge 24 is only exemplary, there may be many such general purpose outputs available in a standard computer system, any of which one of ordinary skill in the art could use to implement the structures and methods described, e.g., the Super I/O 30.

The embodiment shown in FIG. 9 has the multiple path lengths for the RDCLK existing between the PLL 36 and the memory controller 17. Such an implementation is sufficient for implementing a delay of the RDCLK. However, other circuits such as that shown in FIG. 9 may be implemented in other locations within the computer system 100 to selectively phase delay other signals. In one embodiment, a circuit similar to FIG. 9 is implemented in the feed-back path of the PLL, PLL feedback delay circuit 60. That is, the circuit could be implemented between FB Out and FB In connectors of the PLL 36. Implementing the circuit in this location gives the ability to selectively phase delay all of the output signals of the PLL. In another embodiment, there may be a selective path length circuit in both places (feedback delay circuit 60, RDCLK delay circuit 62).

The embodiment shown in FIG. 6 shows both the feedback delay circuit 60 and the RDCLK delay circuit 50. This embodiment allows control of both the DIMMCLK signal and the RDCLCK signal relative to the HCLK. In particular, the feedback delay circuit 60 preferably comprises a series of signal paths having varying lengths similar to that shown in FIG. 9. Adjusting the length of the feedback path of the PLL 36 shifts all of the PLL output signals in phase relative to the PLL input signal, here the HCLK signal. Thus, by choosing feedback paths of different lengths, the system designer may shift both the DIMMCLK and RDCLCK signals relative to the HCLK. This could be done, for instance, to adjust the clock signals for the transfer of data from the memory controller 17 to the main memory array 12. That is, in this embodiment, the memory controller 17 preferably writes data to the memory bus 18 on the rising edge of the HCLK, and the main memory array 12 preferably reads this data on the rising edge of the DIMMCLK. After adjusting the phase lag of the DIMMCLK with respect to the HCLK, the phase lag or time delay of the RDCLK with respect to the DIMMCLK may be altered using the RDCLK delay circuit 50 of FIG. 6. Having set the phase relationship between the HCLK and the DIMMCLK using the feedback delay circuit 60, the phase relationship between the DIMMCLK and the RDCLK may be adjusted by selecting a clock path of a particular length within the delay circuit 62. It must be remembered, however, that adjustments to the length of the feedback path of the PLL 36 by the feedback delay circuit 60 also affects the phase relationship between the HCLK and the RDCLK. Thus, the total phase lag or time delay between the HCLK and the RDCLK is the combined effect of the feedback delay circuit 60 and the RDCLK delay circuit 62.

The above discussion is meant to be illustrative of the principles and various embodiments of the present invention. Numerous variations and modifications will become apparent to those skilled in the art once the above disclosure is fully appreciated. For example, the embodiment shown in FIG. 9 has only two paths for the clock signal to traverse, a short path and a long path. However, one of ordinary skill in the art, now understanding the principles of the preferred embodiments, could easily see that additional paths may be implemented within each location, with each path giving a different time delay, and such a situation would still be within the contemplation of this invention. Further, the embodiments described relate generally to the transfer of information between the memory controller 17 and the main memory array 12; however, the structures and methods described are equally applicable to any transfer of information for which propagation delay and parasitic capacitance must be compensated for. In fact, the selectable path lengths could be used outside the context of data transfer and may be used solely in the context of adjusting phase relationships between clock signals for any reason. Further, the embodiments of the present invention have been described with respect to a computer system; however, any digital system with phase lag or time delay of clock signals within that system are needed is within the contemplation of this invention. These systems could be, without limitation, electronic devices such as palm-type organizers, digital cameras, cellular phones, laptop computers, and the like. It is intended that the following claims be interpreted to embrace all such variations and modifications.

What is claimed is:

1. A computer system, comprising:

a main memory array coupled to a memory controller by way of a memory bus;

a host clock generator having a host clock signal coupled to a phase locked loop (PLL) device and said memory controller;

said PLL device having a plurality of PLL output signals having the same frequency as the host clock output signal, but differing in phase relationship;

one of said PLL outputs signals coupled to said main memory array, and one of said PLL output signals coupled to said memory controller;

a clock delay circuit coupled between said PLL output signal and said memory controller, said clock delay circuit time delays said PLL output signal, said clock delay circuit comprising:

a first signal path having a first length, said first signal path selectable by a first electrically controlled switch coupled to the first signal path; and a second signal path having a length longer than said first length, said second signal path selectable by a second electrically controlled switch coupled to the second signal path;

wherein said clock delay circuit routes said PLL output signal along one of said first signal path for a short time delay, and said second signal path for a long time delay.

2. The computer system as defined in claim 1 wherein said electrically controlled switches further comprise field effect transistors (FETs), thereby creating a first and second FET coupled to the first and second signal paths respectively.

3. The computer system as defined in claim 2 further comprising:

a gate of said first FET coupled to an output signal of a control device;

a gate of said second FET coupled to an output signal of the control device;

the output signals of said control device are selectively asserted by command of software instructions executed by a microprocessor; and wherein the assertion of the output signals acts to select one of the first or second signal paths.

4. The computer system as defined in claim 3 further comprising:
a primary bridge device coupled to said microprocessor; and
a secondary bridge device coupled to the primary bridge device by way of a primary expansion bus;
wherein the control device further comprising said secondary bridge device.

5. The computer system as defined in claim 3 further comprising:
an input/output controller coupled to the microprocessor by way of an expansion bus;
wherein the control device further comprising said input/output controller.

6. The computer system as defined in claim 3 wherein said software instructions determine a number of dual inline memory modules (DIMMs) present in the main memory array of said computer system, and configures the time delay implemented by the clock delay circuit based on the number of DIMMs by asserting outputs of said control device.

7. The computer system as defined in claim 6 wherein said software instructions further comprise a look-up table that indicates the selection of one of the first and second signal paths as a function of the number of DIMMs present in the main memory array of the computer system.

8. The computer system as defined in claim 6 wherein said software instructions test each path of the first and second signal of said clock delay circuit to determine a shortest possible path length to implement as a function of which path length is the shortest useable length without invoking bit errors in data transfers.

9. The computer system as defined in claim 6 further comprising:
a primary bridge device coupled to said microprocessor; and
a secondary bridge device coupled to the primary bridge device by way of a primary expansion bus;
wherein said control device is the secondary bridge device.

10. The computer system as defined in claim 3 wherein said output signals of said control device further comprise digital output signals.

11. The computer system as defined in claim 1 further comprising:
a phase lag circuit coupled within a feedback path of the PLL device that adjusts the phase of the PLL output signals in relation to the host clock signal by selectively implementing different lengths of the feedback path by the selective assertion of one of a plurality of electrically controlled switches, said switches coupled one each to a plurality of feedback signal paths of varying lengths.

12. The computer system as defined in claim 11 wherein said plurality of feedback signal paths of varying lengths further comprise:
a first feedback signal path having a length coupled to and selectable by a first feedback FET; and
a second feedback signal path having a length longer that said first feedback signal path, said second feedback signal path coupled to and selectable by a second feedback FET.

13. The computer system as defined in claim 12 further comprising:
a gate of said first feedback FET coupled to an output signal of a control device;
a gate of said second feedback FET coupled to an output signal of the control device; and
the output signals of the control device are selectively asserted by command of software instructions executed by a microprocessor;
wherein the assertion of the output signals acts to select one of the first or second feedback signal paths.

14. The computer system as defined in claim 13 wherein said selective assertion of output signals by the software instructions is based on a required phase lag between the host clock signal and the PLL output signals as a function of parasitic capacitance present on the memory bus.

15. The computer system as defined in claim 13 further comprising:
a primary bridge device coupled to said microprocessor; and
a secondary bridge device coupled to the primary bridge device by way of a primary expansion bus;
wherein said control device further comprises the secondary bridge device.

16. The computer system as defined in claim 13 further comprising:
an input/output controller coupled to the microprocessor by way of an expansion bus;
wherein said control device further comprises the input/output controller.

17. A method comprising:
coupling a plurality of signal paths, at least two of the plurality having different path lengths, between a source of a read clock and a receiving device, which receiving device uses the read clock as a trigger to read data from a bus;
selecting one of the signal paths by:
determining a number of memory modules present in said sending device; and
referring to a look-up table which directs the use of one of said signal path based on the number of memory modules present;
forcing an electrically controlled switch into a conduction mode, for the path selected, and forcing remaining electrically controlled switches, associated with other paths, into a non-conductive mode; and thereby
adjusting a phase relationship between the read clock and a write clock, used by the sending device as a trigger to drive data to the bus.

18. A system to control phase lag of clock signals within a computer system, comprising:
a host clock device having a host clock (HCLK) output signal;
said HCLK output signal coupled to an input signal of a phase locked loop (PLL) device;
a main memory array coupled to a memory controller by way of a memory bus, said memory array configured to accept a memory module that adds parasitic capacitance to the memory bus;
a PLL output clock signal coupled to said memory controller, said memory controller reads data on said memory bus responsive to said PLL output clock signal;
a read clock (RDCLK) delay circuit coupled between the PLL output clock signal and the memory controller;
at least one control signal coupled to said RDCLK delay circuit; and
wherein the RDCLK delay circuit selectively implements varying length paths for the PLL output clock signal responsive to the control signal.

19. The system to control phase lag of clock signals within a computer system as defined in claim 18 wherein said RDCLK delay circuit further comprises:

a first signal path having a first length, said first signal path selectable by a first electrically controlled switch coupled to the first signal path;

a second signal path having a length longer than said first length, said second signal path selectable by a second electrically controlled switch coupled to the second signal path;

each of said electrically controlled switches having a control input connection coupled to the control signal; and wherein said clock delay circuit routes the PLL output signal along one of said first signal path for a short phase delay, or said second signal path for a long phase delay.

20. The system to control phase lag of clock signals in a computer system as defined in claim 19 wherein the electrically controlled switches of said RDCLK delay circuit further comprise:

field effect transistors (FETs), each having a gate connection; and the control signal coupled to the gate of each FET.

21. The system to control phase lag of clock signals in a computer system as defined in claim 20 further comprising:

an output signal of a bridge device coupled to the at least one control signal;

a software program executed by a microprocessor selectively asserting the output signal of the bridge device based, at least in part, on a number of memory modules present in said computer system.

22. The system to control phase lag of clock signals in a computer system as defined in claim 19 further comprising:

a first FET having its drain coupled to a first end of the first signal path, and a second FET having its source coupled to a second end of the first signal path;

a third FET having its drain coupled to a first end of the second signal path, and a fourth FET having its source coupled to a second end of the second signal path;

gate connections of the first and second FETs coupled to each other, and further coupled to the at least one control signal;

gate connections of the third and fourth FETs coupled to each other, and further coupled to the at least one control signal; and the RDCLK delay circuit implements the first signal path when said first and second FETs are in a conductive mode responsive to the at least one control signal, and said RDCLK delay circuit further implements the second signal path when said third and fourth FETs are in a conductive mode responsive to their gates signal.

23. The system to control phase lag of clock signals in a computer system as defined in claim 19 further comprising:

the gate connections of the first and second FETs coupled to a first control signal;

the gate connections of the third and fourth FETs coupled a second control signal;

each of said first and second control signals coupled to output signals of a control device; and wherein said output signals of the control device are selectively asserted and de-asserted by a software program, executed by a microprocessor.

24. The system to control phase lag of clock signals in a computer system as defined in claim 23 further comprising:

the control device is a secondary bridge device; and the software program is stored on a read only memory coupled to said secondary bridge device.

25. The system to control phase lag of clock signals in a computer system as defined in claim 18 further comprising:

said PLL device having a feedback path, the length of said feedback path controls the phase relationship between the input signal of the PLL device and PLL output signals; and a feedback delay circuit coupled within the feedback path of the PLL device, said feedback delay circuit adapted to selectively change the length of said feedback path, said feedback delay circuit comprising:

a first feedback path having a length, said first feedback path selectable by a first electrically controlled switch coupled to the first feedback path; and a second feedback path having a length longer than the length of the first feedback path, said second feedback path selectable by a second electrically controlled switch coupled to the second feedback path.

26. A method of adaptively controlling phase shift of clock signals in a computer system, comprising:

coupling a host clock signal to a phase locked loop (PLL) device;

coupling the memory controller to a main memory array;

coupling a first PLL output signal to a variable length clock path circuit;

coupling a variable length clock path circuit output signal to the memory controller;

adjusting a length of a clock path through said variable length clock path circuit so as to selectively time delay the variable length clock path output signal relative to the first PLL output signal, wherein said adjusting further comprises:

activating a first electrically controlled switch to select a first clock path having a desired length; and refraining from activating a second electrically controlled switch and thereby not selecting a second clock path.

27. The method as defined in claim 26 further comprising:

implementing a variable length feedback path circuit in a feedback path of the PLL device;

determining the number of memory modules present in a main memory array;

adjusting the length of the feedback path of the PLL device as a function of the number of memory modules to adjust the phase relationship between the host clock signal and PLL output signals, said adjusting accomplished by selecting one of a plurality of possible path lengths in the variable length feedback path circuit by actuating an electrically controlled switch.

28. A method comprising:

determining a number of memory modules in a computer system; and selecting one of a plurality of signal paths of varying length between a clock source and a memory controller to carry a read clock signal between the clock source and the memory controller, the selecting based on the number of memory modules in the computer system; and thereby adjusting a phase relationship between the read clock and a write clock, the write clock used by the memory modules as a trigger to drive data to a bus coupled to the memory controller.

29. The method as defined in claim 28, wherein selecting further comprises:

determining a number of memory modules present in the computer; and referring to a look-up table which directs use of one of said signal paths based on the number of memory modules present.

* * * * *